United States Patent
Sekito et al.

(10) Patent No.: US 9,981,525 B2
(45) Date of Patent: May 29, 2018

(54) AIR CONDITIONING UNIT FOR VEHICLE

(71) Applicant: DENSO CORPORATION, Kariya, Aichi-pref. (JP)

(72) Inventors: Yasuhiro Sekito, Kariya (JP); Syunsuke Ishiguro, Kariya (JP); Shinya Kato, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 70 days.

(21) Appl. No.: 15/128,627

(22) PCT Filed: Mar. 16, 2015

(86) PCT No.: PCT/JP2015/001443
§ 371 (c)(1),
(2) Date: Sep. 23, 2016

(87) PCT Pub. No.: WO2015/146059
PCT Pub. Date: Oct. 1, 2015

(65) Prior Publication Data
US 2017/0120717 A1  May 4, 2017

(30) Foreign Application Priority Data
Mar. 26, 2014  (JP) .................. 2014-064213

(51) Int. Cl.
*B60H 1/00*  (2006.01)
(52) U.S. Cl.
CPC ................. *B60H 1/00028* (2013.01); *B60H 2001/00092* (2013.01)

(58) Field of Classification Search
CPC ............ B60H 1/00021; B60H 1/00028; B60H 2001/00078; B60H 2001/00085; B60H 2001/00092
(Continued)

(56) References Cited

U.S. PATENT DOCUMENTS 4,730,662 A * 3/1988 Kobayashi ......... B60H 1/00828
165/204
6,213,198 B1  4/2001 Shikata et al.
(Continued)

FOREIGN PATENT DOCUMENTS

EP  1457366 A1  9/2004
JP  S60183218 A  9/1985
(Continued)

*Primary Examiner* — Marc Norman
(74) *Attorney, Agent, or Firm* — Harness, Dickey & Pierce, P.L.C.

(57) ABSTRACT

A heater core is disposed to be inclined with respect to an airflow direction so that a first header tank unit is displaced downstream of a second header tank unit in the airflow direction. Therefore, when a first air mixing door blocks a first heating portion, an air stagnates between a downstream lateral portion of the first heating portion and a second partition wall downstream of the first heating portion, and the air is unlikely to be heated downstream of the first heating portion. Likewise, the air is unlikely to be heated upstream of a second heating portion in a second airflow passage. Therefore, a maximum cooling performance of a vehicle air conditioning unit can be restrained from being deteriorated due to a heat from a heater core.

7 Claims, 4 Drawing Sheets

(58) Field of Classification Search
USPC .......................................................... 62/186
See application file for complete search history.

(56) References Cited

U.S. PATENT DOCUMENTS

| | | | | |
|---|---|---|---|---|
| 6,308,770 | B1 * | 10/2001 | Shikata | B60H 1/00064 165/126 |
| 6,761,210 | B1 * | 7/2004 | Arold | B60H 1/00064 165/203 |
| 2003/0000691 | A1 * | 1/2003 | Kim | B60H 1/00064 165/203 |
| 2005/0126774 | A1 | 6/2005 | Yamaguchi et al. | |
| 2009/0025904 | A1 | 1/2009 | Tokunaga et al. | |
| 2014/0034266 | A1 * | 2/2014 | Tabei | B60H 1/00764 165/42 |
| 2016/0288609 | A1 * | 10/2016 | Yamaoka | B60H 1/00021 |
| 2017/0291468 | A1 * | 10/2017 | Jung | B60H 1/00064 |

FOREIGN PATENT DOCUMENTS

| | | |
|---|---|---|
| JP | H07005824 U | 1/1995 |
| JP | H09254630 A | 9/1997 |
| JP | 2005199978 A | 7/2005 |
| JP | 2009023592 A | 2/2009 |
| JP | 2011126401 A | 6/2011 |
| WO | WO-2015146058 A1 | 10/2015 |
| WO | WO-2015146060 A1 | 10/2015 |

* cited by examiner

AIR CONDITIONING UNIT FOR VEHICLE

CROSS-REFERENCE TO RELATED APPLICATIONS

This application is a U.S. National Phase Application under 35 U.S.C. 371 of International Application No. PCT/JP2015/001443 filed on Mar. 16, 2015 and published in Japanese as WO 2015/146059 A1 on Oct. 1, 2015. This application is based on and claims the benefit of priority from Japanese patent application No. 2014-064213 filed on Mar. 26, 2014. The entire disclosures of all of the above applications are incorporated herein by reference.

TECHNICAL FIELD

The present disclosure relates to a vehicle air conditioning unit for blowing an air conditioning wind into a vehicle interior.

BACKGROUND ART

Up to now, a variety of vehicle air conditioning units that blow an air conditioning wind have been known. For example, one of the vehicle air conditioning units is disclosed in Patent Literature 1. The vehicle air conditioning unit of Patent Literature 1 includes an air conditioning case, an evaporator functioning as a cooler that cools an air flowing into the air conditioning case, and a heater core functioning as a heater that heats the air flowing out of the evaporator.

The air conditioning case includes a partitioning member for partitioning an inside of the air conditioning case along an airflow direction, and a first airflow passage and a second airflow passage which are juxtaposed to each other are provided in the air conditioning case by the partitioning member. A heater core is disposed to extend across the first airflow passage and the second airflow passage. Each of the first airflow passage and the second airflow passage includes a cold air passage for allowing a cold air from the evaporator to bypass the heater core outside of the heater core.

The vehicle air conditioning unit in Patent Literature 1 includes an air mixing door that opens or closes a flow channel flowing into the heater core and the cold air passage in the first airflow passage. The same air mixing door is provided in the second airflow passage. Each of the air mixing door of the first airflow passage and the air mixing door of the second airflow passage is disposed in the air flow upstream side with respect to the heater core. In other words, each air mixing door of the first airflow passage and the second airflow passage is structured to block a lateral portion of the heater core on the upstream side when cutting off the air flow toward the heater core.

PRIOR ART LITERATURE

Patent Literature

Patent Literature 1: JP H9-254630 A

SUMMARY OF INVENTION

According to the studies by the present inventors, in each of the first airflow passage and the second airflow passage in the vehicle air conditioning unit of Patent Literature 1, a lateral portion downstream of the heater core is always opened. For that reason, when the air flow to the heater core is blocked by the air mixing door, a part of the cold air passing through the cold air passage comes around the lateral portion downstream of the heater core, and is warmed by the heater core. In other words, the warmed air is mixed in the air conditioning wind blown into a vehicle interior, and a maximum cooling performance of the vehicle air conditioning unit is not a little impaired.

In view of the above difficulties, it is an object of the present disclosure to provide a vehicle air conditioning unit in which an air conditioning case is partitioned along an airflow direction in the air conditioning case, which is capable of suppressing a reduction in a maximum cooling performance attributable to a heat from a heater.

According to a first aspect of the present disclosure, a vehicle air conditioning unit comprises an air conditioning case that defines an in-case airflow passage that allows an air to flow into a vehicle interior, the air conditioning case including a partitioning portion that partitions the in-case airflow passage into a first airflow passage and a second airflow passage along an airflow direction of the in-case airflow passage, a cooler that is disposed in the air conditioning case, the cooler cooling the air and causing the cooled air to flow into the first airflow passage and the second airflow passage, a heater that heats the air flowing out of the cooler, the heater being disposed so as to extend across the first airflow passage and the second airflow passage, the heater including a first heating portion disposed in the first airflow passage and a second heating portion disposed in the second airflow passage, and a first air volume adjustment device that increases or decreases the volume of air passing through the first heating portion, and a second air volume adjustment device that increases or decreases the volume of air passing through the second heating portion, wherein the first airflow passage includes a first bypass passage that allows the air passing through the cooler to bypass the first heating portion, the first airflow passage being disposed on a side of the first heating portion opposite to the second airflow passage, the second airflow passage includes a second bypass passage that allows the air passing through the cooler to bypass the second heating portion, the second airflow passage being disposed on a side of the second heating portion opposite to the first airflow passage, the first heating portion includes a first end defined as a portion of the first heating portion that is farthest from the second heating portion, and an upstream lateral portion on a side at which the air passing through the first heating portion flows in, the second heating portion includes a second end defined as a portion of the second heating portion that is farthest from the first heating portion, and a downstream lateral portion on a side at which the air passing through the second heating portion flows out, the heater is disposed in an inclined manner with respect to an airflow direction, such that the first end is at a position offset downstream in the airflow direction relative to the second end, the first air volume adjustment device blocks the upstream lateral portion of the first heating portion to reduce the volume of air passing through the first heating portion, and the second air volume adjustment device blocks the downstream lateral portion of the second heating portion to reduce the volume of air passing through the second heating portion.

According to the above-described disclosure, in the first airflow passage, since the upstream lateral portion of the first heating portion can be blocked by the first air volume adjustment device, the air flowing in the first bypass passage can be prevented from being heated upstream of the first heating portion. The heater is disposed to be inclined with respect to the airflow direction so that the first end is displaced downstream of the second end in the airflow direction. Therefore, when the first air volume adjustment device blocks the first heating portion, the air stagnates between the first heating portion and the partitioning portion downstream of the first heating portion, as a result of which the air is unlikely to be heated downstream of the first heating portion.

In the second airflow passage, the air flowing in the second bypass passage can be prevented by the second air volume adjustment device from being heated downstream of the second heating portion in the same manner as that in the above first airflow passage. When the second air volume adjustment device blocks the second heating portion, the air stagnates between the second heating portion and the partitioning portion upstream of the second heating portion by the aid of the inclined arrangement of the heater. As a result, the air is unlikely to be heated upstream of the second heating portion. Therefore, the maximum cooling performance of the vehicle air conditioning unit can be restrained from being deteriorated due to a heat from the heater.

DESCRIPTION OF EMBODIMENTS

Figure 1:
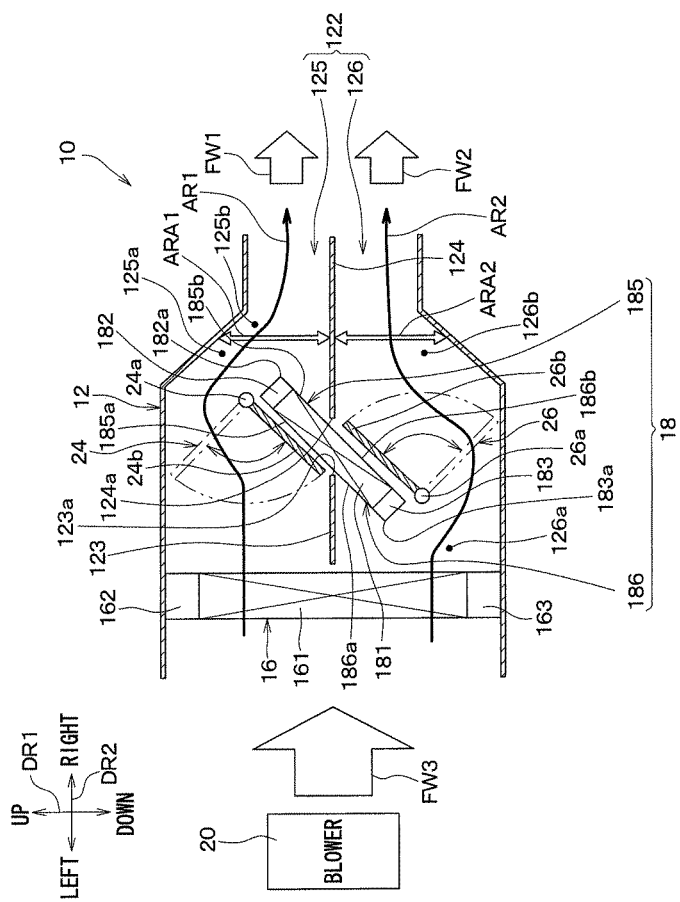
FIG. 1 is a cross-sectional view illustrating a main configuration of a vehicle air conditioning unit when the vehicle air conditioning unit is viewed from a vehicle longitudinal direction according to a first embodiment.

Embodiments of the present disclosure will be described below with reference to the drawings. In the following respective embodiments, parts identical with or equivalent to each other are denoted by the same symbols in the drawings.

First Embodiment

FIG. 1 is a cross-sectional view illustrating a main configuration of a vehicle air conditioning unit 10 when the vehicle air conditioning unit 10 is viewed from a vehicle longitudinal direction according to the present embodiment. In FIG. 1, upper, lower, right, and left arrows DR1 and DR2 indicate orientations in a vehicle mounted state in which the vehicle air conditioning unit 10 is mounted on a vehicle. In other words, double arrows DR1 in FIG. 1 indicate the vehicle vertical direction DR1, and double arrows DR2 indicate the vehicle width direction DR2. The vehicle vertical direction DR1, the vehicle width direction DR2, and a vehicle longitudinal direction are orthogonal to each other. In the vehicle of the present embodiment, a vehicle right side is provided with a driver's seat, and a vehicle left side is provided with a passenger's seat.

The vehicle air conditioning unit 10 in FIG. 1 configures a part of the vehicle air conditioning apparatus including a compressor and a capacitor provided in an engine room of the vehicle. The vehicle air conditioning unit 10 is disposed inside of a dashboard panel, that is, an instrument panel in a foremost portion of a vehicle interior.

As illustrated in FIG. 1, the vehicle air conditioning unit 10 includes an air conditioning case 12, an evaporator 16, a heater core 18, a blower 20, a first air mixing door 24, and a second air mixing door 26.

The air conditioning case 12 is formed of a resin member forming an outer shell of the vehicle air conditioning unit 10, and has a substantially cuboid outline extending in the vehicle width direction DR2. FIG. 1 illustrates a main portion of the overall air conditioning case 12.

The air conditioning case 12 provides an in-case airflow passage 122 that allows an air to flow into the vehicle interior. The in-case airflow passage 122 includes a first airflow passage 125 and a second airflow passage 126. An outside air that is an air of a vehicle exterior or an inside air that is an air of the vehicle interior is introduced into the in-case airflow passage 122 by the blower 20 as indicated by an arrow FW3. At the same time, air flows are generated in the in-case airflow passage 122 as indicated by arrows FW1 and FW2. Therefore, the airflow directions FW1 and FW2 of the in-case airflow passage 122 are directed from the left of the vehicle to the right of the vehicle, that is, are flow direction along the horizontal direction. The arrow FW1 is indicative of the airflow direction FW1 of the first airflow passage 125, and the arrow FW2 is indicative of the airflow direction FW2 of the second airflow passage 126.

An outside air inlet port, not illustrated, for introducing the outside air into the air conditioning case 12, and an inside air inlet port, not illustrated, for introducing the inside air into the air conditioning case 12 are provided in the air conditioning case 12. The outside air and the inside air are introduced into the first airflow passage 125 and the second airflow passage 126 through the evaporator 16. Therefore, both of the outside air inlet port and the inside air inlet port are disposed upstream of the evaporator 16 in the airflow directions FW1 and FW2.

The evaporator 16 is a cooling heat exchanger, that is, a cooler for cooling the air flowing in the air conditioning case 12. The evaporator 16 is housed in the air conditioning case 12. The evaporator 16 is disposed so that the outside air or the inside air introduced into the air conditioning case 12 flows into the evaporator 16. The air cooled by the evaporator 16 is allowed to flow into the first airflow passage 125 and the second airflow passage 126. The evaporator 16 configures a known refrigeration cycle device for circulating a refrigerant, together with a compressor, a capacitor, and an expansion valve, not illustrated. The evaporator 16 cools the air passing through the evaporator 16 by the aid of evaporation of the refrigerant.

A structure of the evaporator 16 is identical with that of a known evaporator generally used in the vehicle air conditioning apparatus. Specifically, the evaporator 16 includes a core portion 161, and a first header tank unit 162 and a second header tank unit 163 which are disposed on respective ends of the core portion 161. The core portion 161 of the evaporator 16 includes multiple refrigerant tubes that communicate with the respective header tank units 162 and 163 and having a flattened cross-sectional shape, and multiple corrugated fins that are provided between the respective refrigerant tubes, and formed into waves. The core portion 161 has a structure in which the refrigerant tubes and the corrugated fins are alternately stacked on each other in the vehicle longitudinal direction.

In the evaporator 16, a heat exchange is performed between the low-temperature refrigerant flowing in the refrigerant tubes and air passing through the core portion 161, to thereby cool the air. Since the core portion 161 is partitioned into multiple fine air passages by the refrigerant tubes and the corrugated fins, the air exclusively flows in the core portion 161 in a thickness direction of the core portion 161.

The evaporator 16 is not disposed to be inclined unlike the heater core 18, and the evaporator 16 is disposed in a posture to be orthogonal to the airflow directions FW1 and FW2 of the in-case airflow passage 122. In other words, the evaporator 16 is disposed upright along the vehicle vertical direction DR1. The first header tank unit 162 is disposed above the core portion 161, and the second header tank unit 163 is disposed below the core portion 161. In other words, the first header tank unit 162 forms an upper end of the evaporator 16, and the second header tank unit 163 forms a lower end of the evaporator 16.

The heater core 18 is a heating heat exchanger, that is, a heater which heats the air flowing out of the evaporator 16 by the aid of an engine coolant that is a hot water. The heater core 18 is disposed downstream of the evaporator 16 in the air flow in the air conditioning case 12. The heater core 18 is disposed to extend across the first airflow passage 125 and the second airflow passage 126.

A structure of the heater core 18 is identical with that of a known heating heat exchanger generally used in the vehicle air conditioning apparatus. Specifically, the heater core 18 includes a core portion 181, and a first header tank unit 182 and a second header tank unit 183 which are disposed on respective ends of the core portion 181. The core portion 181 of the heater core 18 includes multiple hot water tubes that communicate with the respective header tank units 182 and 183 and having a flattened cross-section shape, and multiple corrugated fins that are provided between the respective hot water tubes, and formed into waves. The core portion 181 has a structure in which the hot water tubes and the corrugated fins are alternately stacked on each other in the vehicle longitudinal direction.

In the heater core 18, a heat exchange is performed between the high-temperature engine coolant flowing in the hot water tubes and air passing through the core portion 181, to thereby heat the air. Since the core portion 181 is partitioned into multiple fine air passages by the hot water tubes and the corrugated fins, the air exclusively flows in the core portion 181 in a thickness direction of the core portion 181.

Also, the heater core 18 is installed such that the first header tank unit 182 is located above the second header tank 183. Therefore, the first header tank unit 182 forms an upper end of the heater core 18, and the second header tank unit 183 forms a lower end of the heater core 18. In other words, in the heater core 18, the first header tank unit 182 is provided as a first end disposed in the first airflow passage 125, and the second header tank unit 183 is provided as a second end disposed in the second airflow passage 126.

The heater core 18 is disposed at a distance from the evaporator 16. The heater core 18 is disposed to be inclined with respect to the airflow directions FW1 and FW2 so that the first header tank unit 182 is displaced downstream of the second header tank unit 183 in the airflow directions FW1 and FW2. In other words, the heater core 18 is disposed to be inclined with respect to the vehicle vertical direction DR1, and to be inclined with respect to the vehicle width direction DR2. In detail, the heater core 18 is disposed to be inclined so that the first header tank unit 182 and the second header tank unit 183 do not overlap with each other in the vehicle vertical direction DR1, and do not overlap with each other in the vehicle width direction DR2.

The blower 20 is a centrifugal fan for generating an air flow as indicated by arrows FW1 and FW2 in the air conditioning case 12. The blower 20 is disposed in the air flow upstream side with respect to the evaporator 16. In other words, the vehicle air conditioning unit 10 is an air conditioning unit of a push type layout in which the blower 20 is disposed in the air flow upstream side with respect to the evaporator 16.

The air conditioning case 12 includes a first partition wall 123 and a second partition wall 124 as partitioning portions for partitioning the in-case airflow passage 122 into the first airflow passage 125 and the second airflow passage 126 along the airflow directions FW1 and FW2. The first partition wall 123 and the second partition wall 124 functioning as the partitioning portions partition the in-case airflow passage 122 extending from an upstream side of the heater core 18 to a downstream side of the heater core 18 in the airflow directions FW1 and FW2.

In other words, the first partition wall 123 and the second partition wall 124 function as partition plates for bisecting the in-case airflow passage 122 in the vehicle vertical direction DR1. In detail, the second airflow passage 126 is disposed below the first airflow passage 125 across the first partition wall 123 and the second partition wall 124 in the vehicle vertical direction DR1.

The first partition wall 123 and the second partition wall 124 are disposed to be continuous to each other across the heater core 18 in the vehicle width direction DR2, and installed downstream of the evaporator 16 in the airflow directions FW1 and FW2. Specifically, the first partition wall 123 and second partition wall 124 are formed so as to extend in the airflow directions FW1 and FW 2. The first partition wall 123 is placed between the evaporator 16 and the heater core 18, and partitions the in-case airflow passage 122 between the evaporator 16 and the heater core 18. The second partition wall 124 is disposed downstream of the heater core 18 in the airflow directions FW1 and FW2, and partitions the in-case airflow passage 122 downstream of the heater core 18.

The heater core 18 is disposed to be inclined. For that reason, the first partition wall 123 is disposed such that a downstream end 123a of the first partition wall 123 in the airflow directions FW1 and FW2 is located downstream of a most upstream end 183a located on a most upstream side of the second header tank unit 183 in the heater core 18 in the airflow directions FW1 and FW2. The second partition wall 124 is disposed such that an upstream end 124a of the second partition wall 124 in the airflow directions FW1 and FW2 is located upstream of a most downstream end 182a located on a most downstream side of the first header tank unit 182 in the heater core 18 in the airflow directions FW1 and FW2.

The heater core 18 is disposed across the first airflow passage 125 and the second airflow passage 126. Therefore, the heater core 18 includes a first heating portion 185 disposed in the first airflow passage 125, and a second heating portion 186 disposed in the second airflow passage 126. The first heating portion 185 includes the first header tank unit 182 and a portion of the core portion 181 which is disposed in the first airflow passage 125, and the second heating portion 186 includes the second header tank unit 183 and a portion of the core portion 181 which is disposed in the second airflow passage 126.

Therefore, the first header tank unit 182 of the heater core 18 is an end of the first heating portion 185 which is farthest from the second heating portion 186 in the first heating portion 185. On the other hand, the second header tank unit 183 of the heater core 18 is an end of the second heating portion 186 which is farthest from the first heating portion 185 in the second heating portion 186.

The first airflow passage 125 and the second airflow passage 126 include bypass passages 125a and 126a outside of the heater core 18 in the air conditioning case 12, respectively. In the bypass passages 125a and 126a, the air flows in parallel to the air flow passing through the heater core 18. Those bypass passages 125a and 126a are cold air passages in which a cold air cooled by the evaporator 16 flows without passing through the heater core 18.

In detail, the bypass passage 125a provided in the first airflow passage 125, that is, the first bypass passage 125a allows the air that has passed through the evaporator 16 to bypass the first heating portion 185 of the heater core 18, and to flow to the air flow downstream side than the heater core 18. The bypass passage 126a provided in the second airflow passage 126, that is, the second bypass passage 126a allows the air that has passed through the evaporator 16 to bypass the second heating portion 186 of the heater core 18, and to flow to the air flow downstream side than the heater core 18.

In the first airflow passage 125, the first bypass passage 125a is disposed above the first heating portion 185. In other words, the first bypass passage 125a is disposed on a side of the first heating portion 185 opposite to the second airflow passage 126 side. On the other hand, the second bypass passage 126a is disposed below the second heating portion 186. In other words, the second bypass passage 126a is disposed on a side of the second heating portion 186 opposite to the first airflow passage 125 side.

The first air mixing door 24 is disposed between the evaporator 16 and the first heating portion 185 of the heater core 18 in the first airflow passage 125, and functions as a first air volume adjustment device that increases or decreases the volume of air that passes through the first heating portion 185.

The first heating portion 185 of the heater core 18 includes an upstream lateral portion 185a on a side into which the air passing through the first heating portion 185 flows, and a downstream lateral portion 185b on a side from which the air flows. On the other hand, the first air mixing door 24 blocks not the downstream lateral portion 185b but the upstream lateral portion 185a of the first heating portion 185, to thereby reduce the amount of air passing through the first heating portion 185. In other words, the first air mixing door 24 blocks the upstream lateral portion 185a, to thereby block the air flow passing through the first heating portion 185.

Specifically, the first air mixing door 24 includes a rotating type door mechanism having a door shaft 24a and a door plate portion 24b, and the door plate portion 24b rotates about the door shaft 24a. In other words, that the first air mixing door 24 rotates means that the door plate portion 24b rotates about the door shaft 24a. The first air mixing door 24 is rotated by an electric actuator, not illustrated.

The door shaft 24a of the first air mixing door 24 is located on an end of the first heating portion 185 on the first bypass passage 125a side. In other words, the door shaft 24a of the first air mixing door 24 is disposed such that the door plate portion 24b blocks the upstream lateral portion 185a of the first heating portion 185 between the door shaft 24a and the first partition wall 123.

The first air mixing door 24 adjusts a flow proportion of the volume of air passing through the first heating portion 185 and the volume of air passing through the first bypass passage 125a according to a rotation angle of the first air mixing door 24. In detail, the first air mixing door 24 is rotated from a max cool position where an air flow to the first heating portion 185 is blocked, and the total amount of air flows into the first bypass passage 125a to a max hot position where an air flow to the first bypass passage 125a is blocked, and the total amount of air flows into the first heating portion 185. In FIG. 1, the first air mixing door 24 at the max cool position is indicated by a solid line while the first air mixing door 24 at the max hot position is indicated by a two-dot chain line.

In the first airflow passage 125, the hot air that has passed through the first heating portion 185 of the heater core 18 and the cold air that has passed through the first bypass passage 125a are mixed together downstream of the heater core 18, and blown into the vehicle interior. Therefore, the air flowing in the first airflow passage 125 is adjusted in temperature according to the rotation angle of the first air mixing door 24, and blown into the vehicle interior.

The second air mixing door 26 is disposed in the second airflow passage 126 in the air flow downstream side with respect to the second heating portion 186 of the heater core 18, and functions as a second air volume adjustment device that increases or decreases the volume of air that passes through the second heating portion 186.

The second heating portion 186 of the heater core 18 includes an upstream lateral portion 186a on a side into which the air passing through the second heating portion 186 flows, and a downstream lateral portion 186b on a side from which the air flows. The second air mixing door 26 blocks not the upstream lateral portion 186a but the downstream lateral portion 186b of the second heating portion 186, to thereby reduce the amount of air passing through the second heating portion 186. In other words, the second air mixing door 26 blocks the downstream lateral portion 186b, to thereby block the air flow passing through the second heating portion 186.

Specifically, the second air mixing door 26 includes a rotating type door mechanism having a door shaft 26a and a door plate portion 26b, and the door plate portion 26b rotates about the door shaft 26a. In other words, that the second air mixing door 26 rotates means that the door plate portion 26b rotates about the door shaft 26a. The second air mixing door 26 is rotated by an electric actuator, not illustrated, different from that for the first air mixing door 24.

The door shaft 26a of the second air mixing door 26 is located on an end of the second heating portion 186 on the second bypass passage 126a side. In other words, the door shaft 26a of the second air mixing door 26 is disposed such that the door plate portion 26b blocks the downstream lateral portion 186b of the second heating portion 186 between the door shaft 26a and the second partition wall 124.

The second air mixing door 26 adjusts a flow proportion of the volume of air passing through the second heating portion 186 and the volume of air passing through the second bypass passage 126a according to a rotation angle of the second air mixing door 26. In detail, the second air mixing door 26 is rotated from a max cool position where an air flow to the second heating portion 186 is blocked, and the total amount of air flows into the second bypass passage 126a to a max hot position where an air flow to the second bypass passage 126a is blocked, and the total amount of air flows into the second heating portion 186.

In FIG. 1, the second air mixing door 26 at the max cool position is indicated by a solid line while the second air mixing door 26 at the max hot position is indicated by a two-dot chain line. An arrow AR1 indicates the air flow passing through the first airflow passage 125 when the first air mixing door 24 is positioned at the max cool position, and an arrow AR2 indicates the air flow passing through the second airflow passage 126 when the second air mixing door 26 is positioned at the max cool position.

In the second airflow passage 126, the hot air that has passed through the second heating portion 186 of the heater core 18 and the cold air that has passed through the second bypass passage 126a are mixed together downstream of the heater core 18, and blown into the vehicle interior. Therefore, the air flowing in the second airflow passage 126 is adjusted in temperature according to the rotation angle of the second air mixing door 26, and blown into the vehicle interior.

Multiple air blowing ports, not illustrated, which blow the air conditioning wind adjusted in temperature by the first airflow passage 125 or the second airflow passage 126 are provided in the air conditioning case 12. The air conditioning wind of the first airflow passage 125 and the air conditioning wind of the second airflow passage 126 are blown into the vehicle interior through any one of the multiple air blowing ports. The multiple air blowing ports include, for example, a face blowing port for blowing the air conditioning wind toward an upper body of an occupant in the vehicle interior, a foot blowing port for blowing the air conditioning wind toward occupant's feet, and a defroster blowing port for blowing the air conditioning wind toward an inner surface of a vehicle windshield.

Further, in the vehicle air conditioning unit 10, the inside air and the outside air are introduced into the air conditioning case 12 so that the outside air is allowed to exclusively flow into the first airflow passage 125 while the inside air is allowed to exclusively flow into the second airflow passage 126. With the above configuration, an inside/outside air two-layer mode in which the outside air is blown upward in the vehicle interior, and the inside air is blown downward in the vehicle interior can be realized. In the inside/outside air two-layer mode, for example, the first airflow passage 125 is communicated with the face blowing port and the defroster blowing port, and the second airflow passage 126 is communicated with the foot blowing port.

As illustrated in FIG. 1, the first airflow passage 125 includes a first flow reduction portion 125b that reduces a passage cross-sectional area ARA1 of the first airflow passage 125 more toward a downstream side in the airflow directions FW1 and FW2, downstream of the first heating portion 185. The same is applied to the second airflow passage 126, and the second airflow passage 126 includes a second flow reduction portion 126b that reduces a passage cross-sectional area ARA2 of the second airflow passage 126 more toward a downstream side in the airflow directions FW1 and FW2, downstream of the second heating portion 186.

The passage cross-sectional area ARA1 of the first airflow passage 125 indicates an area of a cross-section of the first airflow passage 125 which is orthogonal to the airflow direction FW1 of the first airflow passage 125, that is, the vehicle width direction DR2. The passage cross-sectional area ARA2 of the second airflow passage 126 indicates an area of a cross-section of the second airflow passage 126 which is orthogonal to the airflow direction FW2 of the second airflow passage 126, that is, the vehicle width direction DR2.

As described above, according to the present embodiment, since the upstream lateral portion 185a of the first heating portion 185 can be blocked by the first air mixing door 24 in the first airflow passage 125, the air flowing in the first bypass passage 125a can be prevented from being heated upstream of the first heating portion 185. The heater core 18 is disposed to be inclined with respect to the airflow directions FW1 and FW2 so that the first header tank unit 182 is located to be displaced downstream of the second header tank unit 183 in the airflow directions FW1 and FW2. With the above configuration, the downstream lateral portion 185b of the first heating portion 185 and the second partition wall 124 are disposed to be formed into a V-shape when viewed from the vehicle longitudinal direction as illustrated in FIG. 1. Therefore, when the first air mixing door 24 blocks the first heating portion 185, an air stagnates between the downstream lateral portion 185b of the first heating portion 185 and the second partition wall 124 downstream of the first heating portion 185. As a result, the air is unlikely to be heated downstream of the first heating portion 185.

In the second airflow passage 126, the air flowing in the second bypass passage 126a can be prevented by the second air mixing door 26 from being heated downstream of the second heating portion 186 in the same manner as that in the above first airflow passage 125. With the inclined placement of the heater core 18 described above, the upstream lateral portion 186a of the second heating portion 186 and the first partition wall 123 are disposed to be formed into a V-shape when viewed from the vehicle longitudinal direction. Therefore, when the second air mixing door 26 blocks the second heating portion 186, an air stagnates between the upstream lateral portion 186a of the second heating portion 186 and the first partition wall 123 upstream of the second heating portion 186. As a result, the air is unlikely to be heated upstream of the second heating portion 186. Therefore, a maximum cooling performance of the vehicle air conditioning unit 10 can be restrained from being deteriorated due to a heat from the heater core 18.

According to the present embodiment, the first airflow passage 125 includes the first flow reduction portion 125b that reduces the passage cross-sectional area ARA1 of the first airflow passage 125 more toward the downstream side in the airflow directions FW1 and FW2, downstream of the first heating portion 185. The second airflow passage 126 includes the second flow reduction portion 126b that reduces the passage cross-sectional area ARA2 of the second airflow passage 126 more toward the downstream side in the airflow directions FW1 and FW2, downstream of the second heating portion 186. A heat damage that the cold air that passes through the bypass passages 125a and 126a is heated by the heater core 18 due to the air flow around the heater core 18 which is caused by the flow reduction portions 125b and 126b is liable to be significant. However, in the present embodiment, with the placement of the respective air mixing doors 24 and 26, and the inclined placement of the heater core 18, the heat damage can be appropriately suppressed.

According to the present embodiment, since the downstream end 123a of the first partition wall 123 is located downstream of the most upstream end 183a of the heater core 18, an air is liable to stagnate between the upstream lateral portion 186a of the second heating portion 186 and the first partition wall 123. For that reason, the air flowing in the second bypass passage 126a is likely to be restrained from being heated by the upstream lateral portion 186a of the second heating portion 186.

According to the present embodiment, since the upstream end 124a of the second partition wall 124 is located upstream of the most downstream end 182a of the first heating portion 185, an air is liable to stagnate between the downstream lateral portion 185b of the first heating portion 185 and the second partition wall 124. For that reason, the air flowing in the first bypass passage 125a is likely to be restrained from being heated by the downstream lateral portion 185b of the first heating portion 185.

Second Embodiment

Next, a second embodiment of the present disclosure will be described. In the present embodiment, features which are different from those in the above-described first embodiment will be mainly described. Elements which are the same as or equivalent to those in the above-described embodiment will be omitted or simplified in the description. The omission or the simplification is similarly applied to embodiments subsequent to a third embodiment to be described later.

Figure 2:
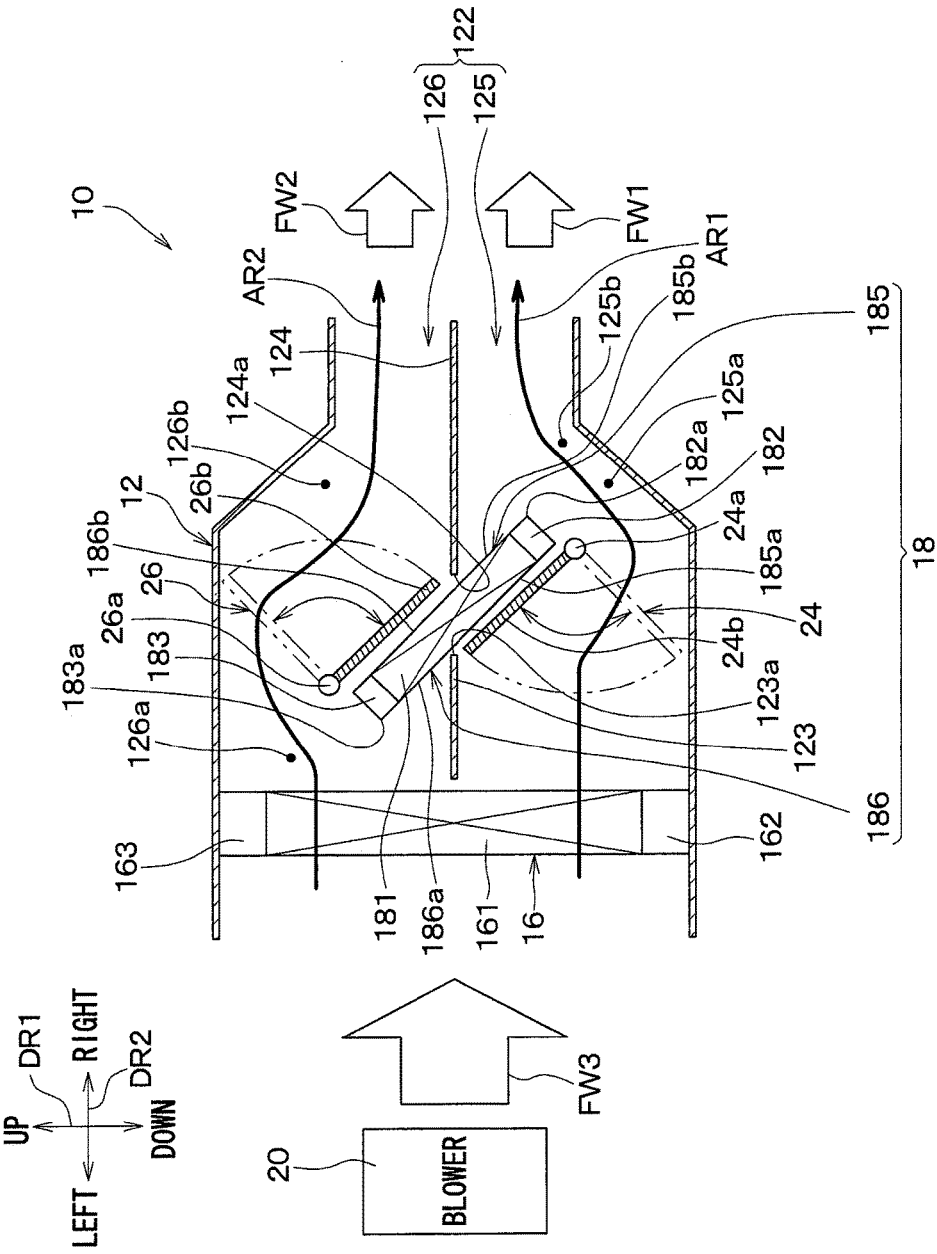
FIG. 2 is a cross-sectional view illustrating a main configuration of a vehicle air conditioning unit, which corresponds to FIG. 1, according to a second embodiment.

FIG. 2 is a cross-sectional view illustrating a main configuration of a vehicle air conditioning unit 10 according to the present embodiment, which corresponds to FIG. 1. In the vehicle air conditioning unit 10 of the present embodiment, contrary to the first embodiment described above, a first airflow passage 125 is disposed below a second airflow passage 126 in a vehicle vertical direction DR1. In other words, in the present embodiment, a placement of the first airflow passage 125 and the second airflow passage 126 are upside down with respect to that in FIG. 1.

As illustrated in FIG. 2, in the present embodiment, the first airflow passage 125 is a lower airflow passage and the second airflow passage 126 is an upper airflow passage in an air conditioning case 12. For that reason, in an inside/outside air two-layer mode, an inside air is exclusively introduced into the first airflow passage 125, and an outside air is exclusively introduced into the second airflow passage 126. The first airflow passage 125 is communicated with, for example, a foot blowing port, and the second airflow passage 126 is communicated with, for example, a face blowing port and a defroster blowing port.

In an evaporator 16, a first header tank unit 162 forms a lower end of the evaporator 16, and a second header tank unit 163 forms an upper end of the evaporator 16. In a heater core 18, a first header tank unit 182 forms a lower end of the heater core 18, and a second header tank unit 183 forms an upper end of the heater core 18. A first bypass passage 125a is disposed below a first heating portion 185, and a second bypass passage 126a is disposed above a second heating portion 186.

According to the present embodiment, since the respective air flows in the first airflow passage 125 and the second airflow passage 126 are identical with those in the first embodiment, the same advantages as those in the first embodiment can be obtained.

Third Embodiment

Next, a third embodiment of the present disclosure will be described. In the present embodiment, features which are different from those in the above-described first embodiment will be mainly described.

Figure 3:
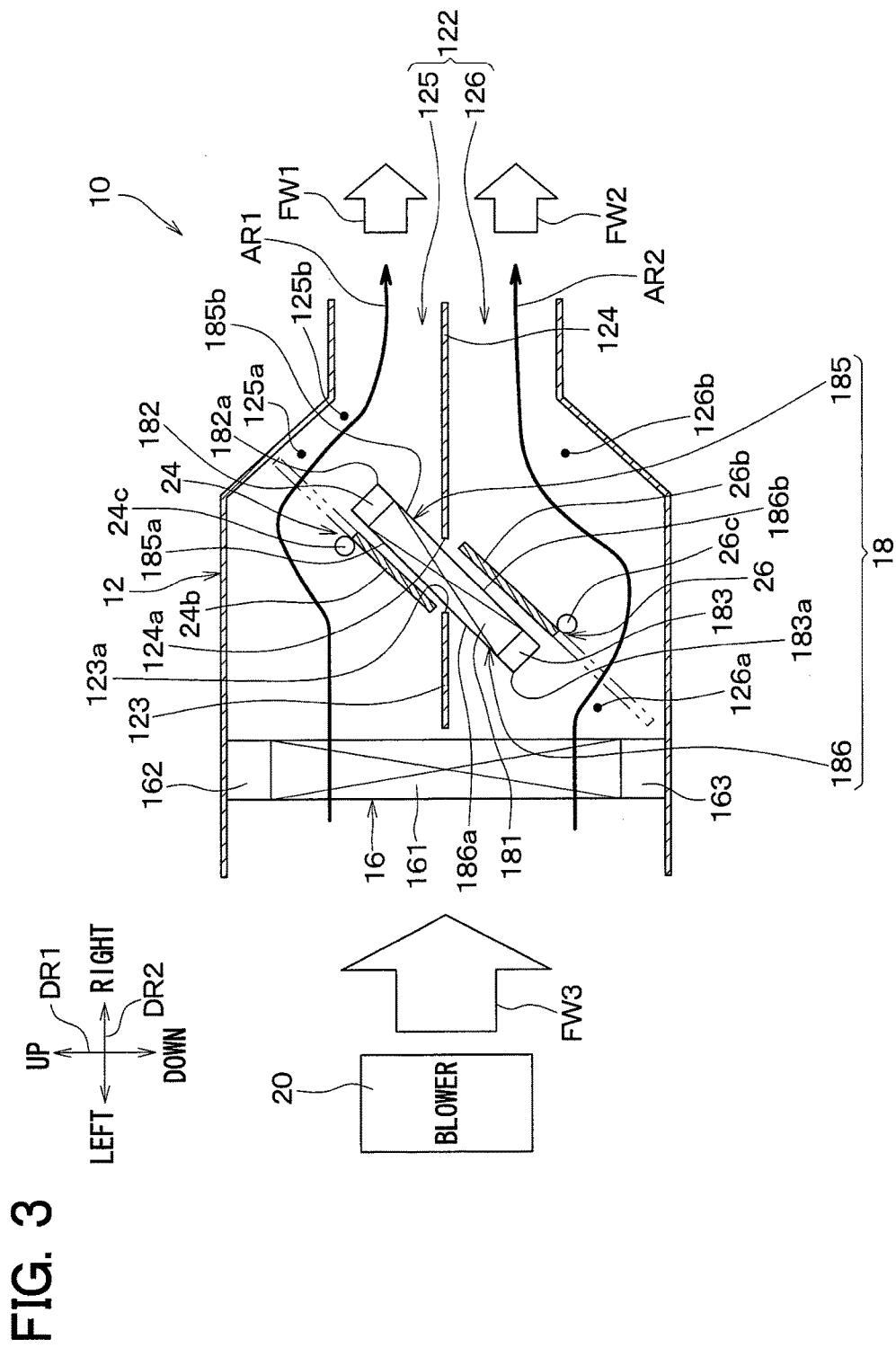
FIG. 3 is a cross-sectional view illustrating a main configuration of a vehicle air conditioning unit, which corresponds to FIG. 1, according to a third embodiment.

FIG. 3 is a cross-sectional view illustrating a main configuration of a vehicle air conditioning unit 10 according to the present embodiment, which corresponds to FIG. 1. A vehicle air conditioning unit 10 according to the present embodiment is different from that in the first embodiment described above in that each of air mixing doors 24 and 26 has a slide door mechanism.

As illustrated in FIG. 3, the first air mixing door 24 has the slide door mechanism, and is slid by an electric actuator, not illustrated. For example, a rack and pinion mechanism may be employed as a drive mechanism of the first air mixing door 24. The first air mixing door 24 includes a door plate portion 24b and a pinion 24c that is meshed with a rack fixed to the door plate portion 24b. The first air mixing door 24 performs slide operation by allowing the pinion 24c to be rotated by the electric actuator.

The first air mixing door 24 adjusts a flow proportion of the volume of air passing through the first heating portion 185 and the volume of air passing through the first bypass passage 125a according to a slide position of the first air mixing door 24. In detail, the first air mixing door 24 is slid from a max cool position where an air flow to the first heating portion 185 is blocked, and the total amount of air flows into the first bypass passage 125a to a max hot position where an air flow to the first bypass passage 125a is blocked, and the total amount of air flows into the first heating portion 185. In FIG. 1, the first air mixing door 24 at the max cool position is indicated by a solid line while the first air mixing door 24 at the max hot position is indicated by a two-dot chain line.

The second air mixing door 26 has the same slide door mechanism as that of the first air mixing door 24, and is slid by an electric actuator, not illustrated. The same rack and pinion mechanism as that in the first air mixing door 24 is employed as a drive mechanism, and the second air mixing door 26 includes a door plate portion 26b and a pinion 26c that is meshed with a rack fixed to the door plate portion 26b.

The second air mixing door 26 adjusts a flow proportion of the volume of air passing through the second heating portion 186 and the volume of air passing through the second bypass passage 126a according to a slide position of the second air mixing door 26. In detail, the second air mixing door 26 is slid from a max cool position where an air flow to the second heating portion 186 is blocked, and the total amount of air flows into the second bypass passage 126a to a max hot position where an air flow to the second bypass passage 126a is blocked, and the total amount of air flows into the second heating portion 186. In FIG. 1, the second air mixing door 26 at the max cool position is indicated by a solid line while the second air mixing door 26 at the max hot position is indicated by a two-dot chain line.

According to the present embodiment, since the respective air flows in the first airflow passage 125 and the second airflow passage 126 are identical with those in the first embodiment, the same advantages as those in the first embodiment can be obtained.

Fourth Embodiment

Next, a fourth embodiment of the present disclosure will be described. In the present embodiment, features which are different from those in the above-described second embodiment will be mainly described.

Figure 4:
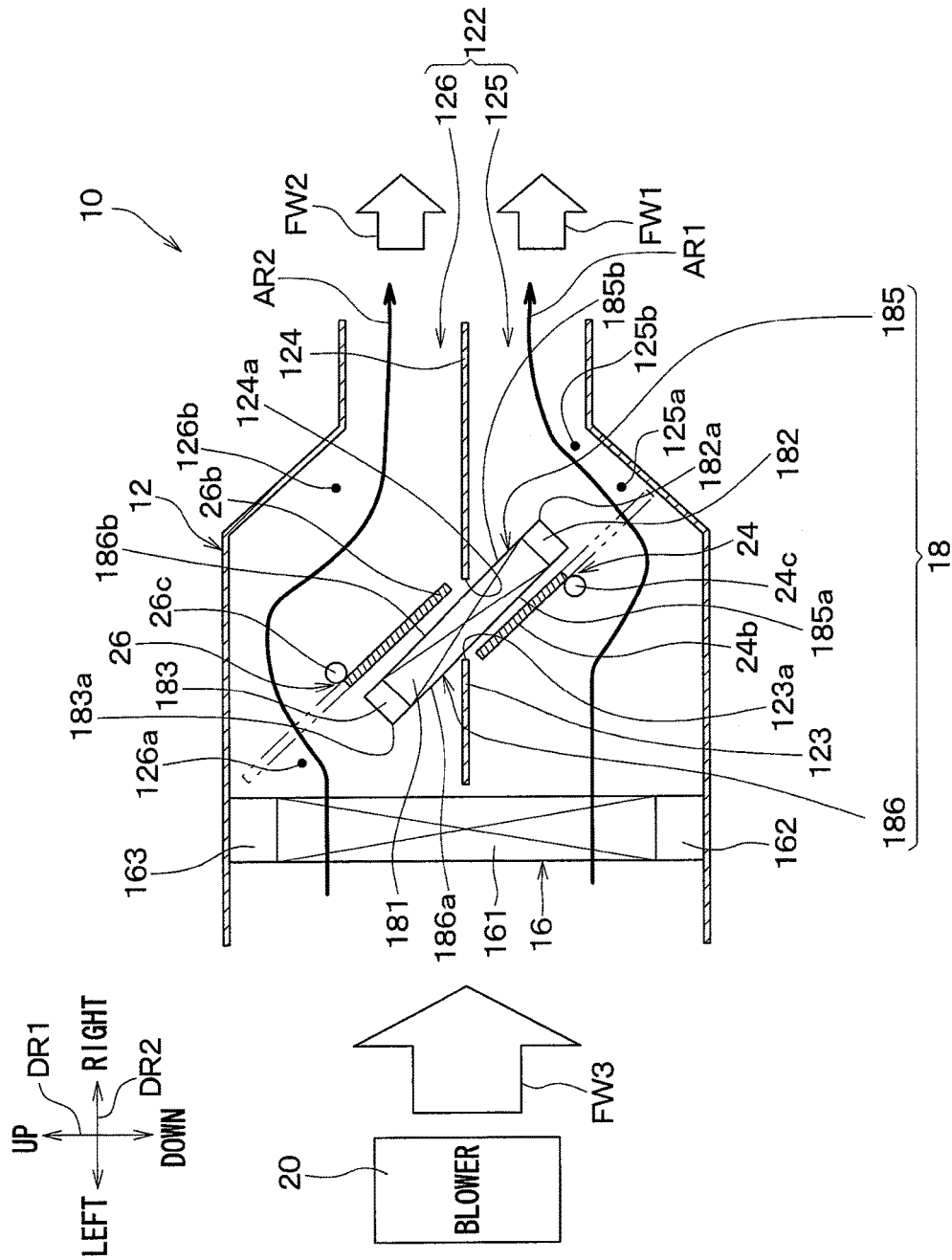
FIG. 4 is a cross-sectional view illustrating a main configuration of a vehicle air conditioning unit, which corresponds to FIG. 2, according to a fourth embodiment.

FIG. 4 is a cross-sectional view illustrating a main configuration of a vehicle air conditioning unit 10 according to the present embodiment, which corresponds to FIG. 2. The vehicle air conditioning unit 10 according to the present embodiment is different from that in the second embodiment described above in that each of air mixing doors 24 and 26 has a slide door mechanism.

As illustrated in FIG. 4, the first air mixing door 24 according to the present embodiment is identical with the first air mixing door 24 of the third embodiment. A second air mixing door 26 according to the present embodiment is identical with the second air mixing door 26 of the third embodiment.

According to the present embodiment, since the respective air flows in a first airflow passage 125 and a second airflow passage 126 are identical with those in the second embodiment, the same advantages as those in the second embodiment can be obtained.

Other Embodiments (1) In the respective embodiments described above, the evaporator 16 is disposed upright along the vehicle vertical direction DR1, and is not inclined with respect to the airflow directions FW1 and FW2. Alternatively, the evaporator 16 may be disposed to be inclined with respect to the airflow directions FW1 and FW2. For example, the evaporator 16 may be disposed to be inclined in the same direction as that of the heater core 18 with respect to the airflow directions FW1 and FW2.

(2) in the respective embodiments described above, the vehicle air conditioning unit 10 is configured by a push type layout. Alternatively, the vehicle air conditioning unit 10 may be configured by a suction type layout in which the blower 20 is disposed in the air flow downstream side with respect to the evaporator 16.

(3) In the first and second embodiments described above, each of the air mixing doors 24 and 26 is configured by a pivoted door. Alternatively, each of the air mixing doors 24 and 26 may be configured by a film door or a multi-plate butterfly door. The same is applied to the respective air mixing doors 24 and 26 in the third and fourth embodiments. A door mechanism of a type in which the air mixing doors 24 and 26 are different from each other may be employed.

(4) In the respective embodiments described above, the heater core 18 is a heater that heats the air flowing in the air conditioning case 12 with the use of a waste heat of an engine. Alternatively, there is no need to use the waste heat of the engine, and, for example, an electric heater may be used as the heater instead of the heater core 18.

(5) In the respective embodiments described above, the first airflow passage 125 and the second airflow passage 126 are disposed to be aligned in the vehicle vertical direction DR1. Alternatively, the first airflow passage 125 and the second airflow passage 126 may be disposed to be aligned in directions other than the vehicle vertical direction DR1.

(6) In the respective embodiments described above, the first airflow passage 125 and the second airflow passage 126 are extended in the vehicle width direction DR2. Alternatively, the first airflow passage 125 and the second airflow passage 126 may be extended in directions other than the vehicle width direction DR2.

(7) In the respective embodiments described above, the vehicle air conditioning unit 10 is configured by the air conditioning unit that can realize the inside/outside two-layer mode. Alternatively, the vehicle air conditioning unit 10 may be configured by, for example, an air conditioning unit for performing a right and left independent temperature control for adjusting the temperature of the right and the left of the vehicle interior, independently. In that case, one of the first airflow passage 125 and the second airflow passage 126 is provided to blow the air conditioning wind toward the left of the vehicle interior, and the other airflow passage is provided to blow the air conditioning wind toward the right of the vehicle interior.

(8) In the respective embodiments described above, each of the partition walls 123 and 124 is disposed downstream of the evaporator 16 in the airflow directions FW1 and FW2. In addition to those partition walls 123 and 124 on the downstream side, a partition wall may be provided on the upstream side of the evaporator 16, and the interior of the air conditioning case 12 may be partitioned vertically on the upstream side of the evaporator 16.

The present disclosure is not limited to the above described embodiments, and may be appropriately changed with respect to the scope described in the claims. Further, needless to say, in each of the above described embodiments, the elements constituting each embodiment are not necessarily essential, except for elements which are specifically shows as being essential or are clearly essential on a fundamental level. Further, in each of the above described embodiments, in case a numerical value is described for a counting number, a value, an amount, a range or the like for a component element of an embodiment, these specific values are not limiting, except in the case in which a specific number liming is clearly described as being essential or is clearly essential on a fundamental level. Further, in each of the above described embodiments, if the material properties, shapes, positional relationships or the like of component elements of an embodiment are described, these material properties, shapes, positional relationships or the like are not limiting, except in the case in which a specific material property, shape, positional relationship or the like is clearly described as being essential or is clearly essential on a fundamental level.

What is claimed is:

1. A vehicle air conditioning unit comprising:
    an air conditioning case that defines an in-case airflow passage that allows an air to flow into a vehicle interior, the air conditioning case including a partitioning portion that partitions the in-case airflow passage into a first airflow passage and a second airflow passage along an airflow direction of the in-case airflow passage;
    a cooler that is disposed in the air conditioning case, the cooler cooling the air and causing the cooled air to flow into the first airflow passage and the second airflow passage;
    a heater that heats the air flowing out of the cooler, the heater being disposed so as to extend across the first airflow passage and the second airflow passage, the heater including a first heating portion disposed in the first airflow passage and a second heating portion disposed in the second airflow passage; and
    a first air volume adjustment device that increases or decreases the volume of air passing through the first heating portion; and
    a second air volume adjustment device that increases or decreases the volume of air passing through the second heating portion, wherein
    the first airflow passage includes a first bypass passage that allows the air passing through the cooler to bypass the first heating portion, the first airflow passage being disposed on a side of the first heating portion opposite to the second airflow passage,
    the second airflow passage includes a second bypass passage that allows the air passing through the cooler to bypass the second heating portion, the second airflow passage being disposed on a side of the second heating portion opposite to the first airflow passage, the first heating portion includes
    a first end defined as a portion of the first heating portion that is farthest from the second heating portion, and
    an upstream lateral portion on a side at which the air passing through the first heating portion flows in,
the second heating portion includes
    a second end defined as a portion of the second heating portion that is farthest from the first heating portion, and
    a downstream lateral portion on a side at which the air passing through the second heating portion flows out,
the heater is disposed in an inclined manner with respect to an airflow direction, such that the first end is at a position offset downstream in the airflow direction relative to the second end,
the first air volume adjustment device blocks the upstream lateral portion of the first heating portion to reduce the volume of air passing through the first heating portion, and
the second air volume adjustment device blocks the downstream lateral portion of the second heating portion to reduce the volume of air passing through the second heating portion.

2. The vehicle air conditioning unit according to claim 1, wherein
the first airflow passage includes a first flow reduction portion along which a passage cross-sectional area of the first airflow passage is increasingly reduced toward downstream in the airflow direction, the first flow reduction portion being downstream of the first heating portion.

3. The vehicle air conditioning unit according to claim 1, wherein
the second airflow passage includes a second flow reduction portion along which a passage cross-sectional area of the second airflow passage is increasingly reduced toward downstream in the airflow direction, the second flow reduction portion being downstream of the second heating portion.

4. The vehicle air conditioning unit according to claim 1, wherein
the partitioning portion includes a first partition wall that partitions the in-case airflow passage between the cooler and the heater, and
the first partition wall is disposed such that a downstream end of the first partition wall in the airflow direction is located downstream of a most upstream end located on a most upstream side in the airflow direction in the second end of the second heating portion.

5. The vehicle air conditioning unit according to claim 1, wherein
the partitioning portion includes a second partition wall that partitions the in-case airflow passage downstream of the heater in the airflow direction, and
the second partition wall is disposed such that an upstream end of the second partition wall in the airflow direction is located upstream of a most downstream end located on a most downstream side in the airflow direction in the first end of the first heating portion.

6. The vehicle air conditioning unit according to claim 1, wherein
the partitioning portion includes a first partition wall that partitions the in-case airflow passage between the cooler and the heater,
the first air volume adjustment device includes a rotating type door mechanism having a door shaft and a door plate portion that rotates about the door shaft to open or close the upstream lateral portion of the first heating portion, and
the door shaft of the first air volume adjustment device is disposed such that the door plate portion of the first air volume adjustment device blocks the upstream lateral portion of the first heating portion between the door shaft and the first partition wall.

7. The vehicle air conditioning unit according to claim 1, wherein
the partitioning portion includes a second partition wall that partitions the in-case airflow passage downstream of the heater in the airflow direction,
the second air volume adjustment device includes a rotating type door mechanism having a door shaft and a door plate portion that rotates about the door shaft to open or close the downstream lateral portion of the second heating portion, and
the door shaft of the second air volume adjustment device is disposed such that where the door plate portion of the second air volume adjustment device blocks the downstream lateral portion of the second heating portion between the door shaft and the second partition wall.

* * * * *